March 16, 1954

K. ENSLEIN

VERTICAL SYNCHRONIZATION CIRCUIT FOR TELEVISION RECEIVERS 2,672,510

Filed Sept. 28, 1950

5 Sheets-Sheet 1

INVENTOR.

Kurt Enslein

BY J. L. Bowes

ATTORNEY

March 16, 1954 K. ENSLEIN 2,672,510

VERTICAL SYNCHRONIZATION CIRCUIT FOR TELEVISION RECEIVERS

Filed Sept. 28, 1950 5 Sheets-Sheet 2

INVENTOR.
Kurt Enslein
BY J. L. Bowes
ATTORNEY

March 16, 1954

K. ENSLEIN

VERTICAL SYNCHRONIZATION CIRCUIT FOR TELEVISION RECEIVERS 2,672,510

Filed Sept. 28, 1950

5 Sheets-Sheet 3

INVENTOR.
Kurt Enslein
BY J. L. Bowers
ATTORNEY

INVENTOR.
Kurt Enslein
BY T. L. Bowes
ATTORNEY

INVENTOR.
Kurt Enslein
BY J. L. Bowes
ATTORNEY

Patented Mar. 16, 1954

2,672,510

UNITED STATES PATENT OFFICE 2,672,510

VERTICAL SYNCHRONIZATION CIRCUIT FOR TELEVISION RECEIVERS

Kurt Enslein, Rochester, N. Y., assignor to Stromberg-Carlson Company, a corporation of New York Application September 28, 1950, Serial No. 187,207

28 Claims. (Cl. 178—69.5)

The present invention relates to television receivers, and more particularly, to synchronization circuits for the vertical scanning generator of a television receiver.

In many instances, it is desirable to provide a pulse synchronization circuit for a low frequency oscillator. Such an instance arises in the case of television receivers wherein it is necessary to synchronize both a relatively high frequency horizontal scanning generator and a low frequency vertical scanning generator to reconstruct the transmitted image. Certain arrangements heretofore proposed have employed arrangements for direct synchronization of the vertical scanning generator in which the composite synchronizing signal is simply integrated and applied to the vertical scanning generator. This arrangement is quite sensitive to noise interference since no attempt is made to remove the noise present in the original signal. Also, such arrangements are unsatisfactory in that a large noise pulse may cause the preceding amplifiers to block for a long enough period that the next succeeding pulse is not produced, and hence consistent stable triggering of the vertical scanning generator is not obtained.

While certain other arrangements heretofore proposed have employed a resonant circuit to discriminate against noise voltages by means of the so-called "flywheel" effect of the oscillatory circuit, these arrangements employ a resonant circuit of substantially the same frequency as the synchronizing pulses and are relatively unsatisfactory for low frequency work such as is required in the vertical synchronization circuit of a television receiver both from the standpoint of cost and efficiency of operation.

In conventional television receivers it is also common practice to employ an automatic frequency control circuit, commonly called an AFC circuit, for controlling the frequency of the horizontal scanning generator to stabilize this generator and to reduce the susceptibility of the generator to respond to noise pulses. Such an AFC circuit may, for example, comprise a phase and frequency sensitive circuit having a relatively long time constant so that it is relatively insensitive to short time transients. However, no such AFC circuit is conventionally employed in connection with the vertical sweep generator inasmuch as an AFC circuit for both horizontal and vertical generators is prohibitive from the cost standpoint.

Accordingly, it is a primary object of the present invention to provide a new and improved vertical synchronization circuit for a television receiver.

It is another object of the present invention to provide a new and improved vertical synchronization circuit for a television receiver in which substantial discrimination against noise voltages and other extraneous impulses is provided.

It is a further object of the present invention to provide a new and improved vertical synchronization circuit for a television receiver which is extremely stable and which operates satisfactorily regardless of variations in the supply voltages and the constants of the circuit components.

Still another object of the present invention resides in the provision of a new and improved vertical synchronization circuit for a television receiver which is extremely simple in arrangement and is of low cost and wherein a substantial discrimination against noise impulses is achieved.

It is a further object of the present invention to provide a new and improved vertical synchronization circuit for a television receiver which is stabilized by means of an automatic frequency controlled horizontal scanning generator of the receiver.

It is a still further object of the present invention to provide a new and improved vertical synchronization circuit for a television receiver in which an automatic frequency controlled horizontal scanning generator of the receiver is employed as a standard to control at least in part the operation of the vertical synchronization circuit.

The invention, both as to its organization and method of operation, together with further objects and advantages thereof, will best be understood by reference to the following specification taken in connection with the accompanying drawings, in which.

Figure 1:
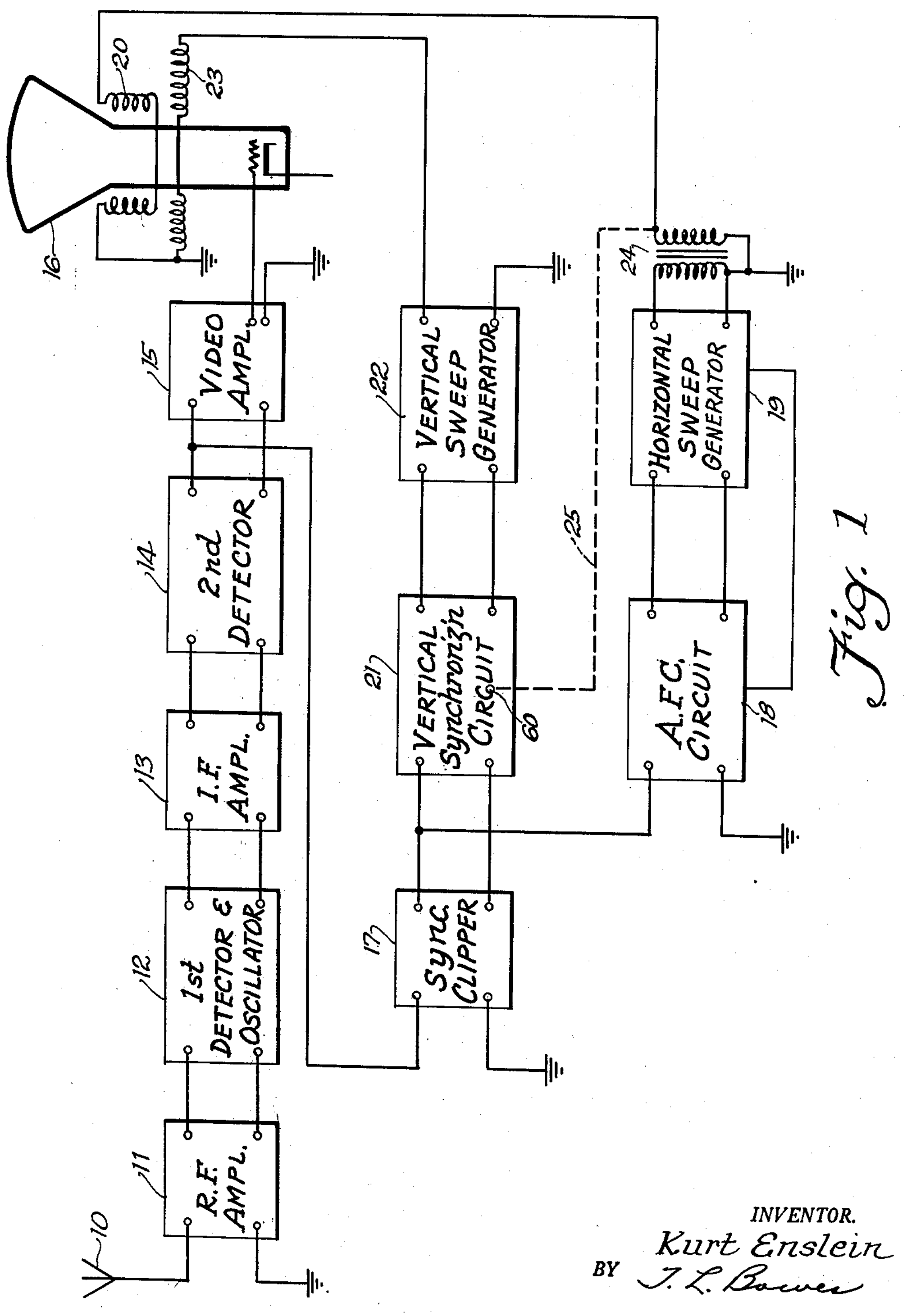
Fig. 1 is a block diagram of a television receiver employing the vertical synchronization circuit of the present invention.

Referring now to the drawings and more particularly to Fig. 1 thereof, the system there illustrated comprises a television receiver of the superheterodyne type including an antenna system 10, connected to a radio frequency amplifier 11, to which are connected in cascade, in the order named, a first detector and oscillator 12, an intermediate frequency amplifier 13, a second detector 14, a video frequency amplifier 15 and an image reproducing cathode ray tube 16. The output of the detector 14 is coupled through a synchronizing pulse clipper 17, the output of which is coupled through an AFC circuit 18 and a horizontal sweep generator 19 to the horizontal deflecting windings 20 which surround the neck of the cathode ray tube 16. The ouput of the synchronizing pulse clipper 17 is also connected to the vertical synchronizing circuit 21 of the present invention, which in one embodiment is also controlled by the horizontal scanning generator 19 over the conductor 25, the ouput of the circuit 21 being connected through a vertical sweep generator 22 to the vertical deflection coils 23 which also surround the cathode ray tube 16. The stages or units 10 to 19, inclusive, and 22 may all be of conventional well known construction so that a detailed illustration and description thereof is deemed unnecessary herein.

Referring briefly, however, to the general mode of operation of the system described above, television signals intercepted by the antenna circuit 10 are selected and amplified in the radio frequency amplifier 11 and transmitted to the first detector and oscillator 12, where they are converted into intermediate frequency signals which, in turn, are selectively amplified in the intermediate frequency amplifier 13 and delivered to the second detector 14. The modulation components of the signal are detected by the second detector 14 and the video frequency signals are supplied to the video frequency amplifier 15 where they are further amplified and from which they are supplied in the usual manner to the brillance control electrode of the image reproducing device 16. The composite television signal is supplied to the synchronizing pulse clipper 17 which separates the composite synchronizing signal from the video signals and supplies the composite synchronizing signal to the AFC circuit 18 and the vertical synchronization circuit 21. Scanning waves are generated in the horizontal and vertical sweep generators 19 and 22, which are controlled by synchronizing voltages supplied thereto from the units 18 and 21, and are applied to the scanning coils 20 and 23 to produce electromagnetic scanning fields, thereby to deflect the scanning ray in two directions perpendicular to each other so as to trace a rectilinear scanning pattern on the screen and to reconstruct the transmitted image.

Figure 2:
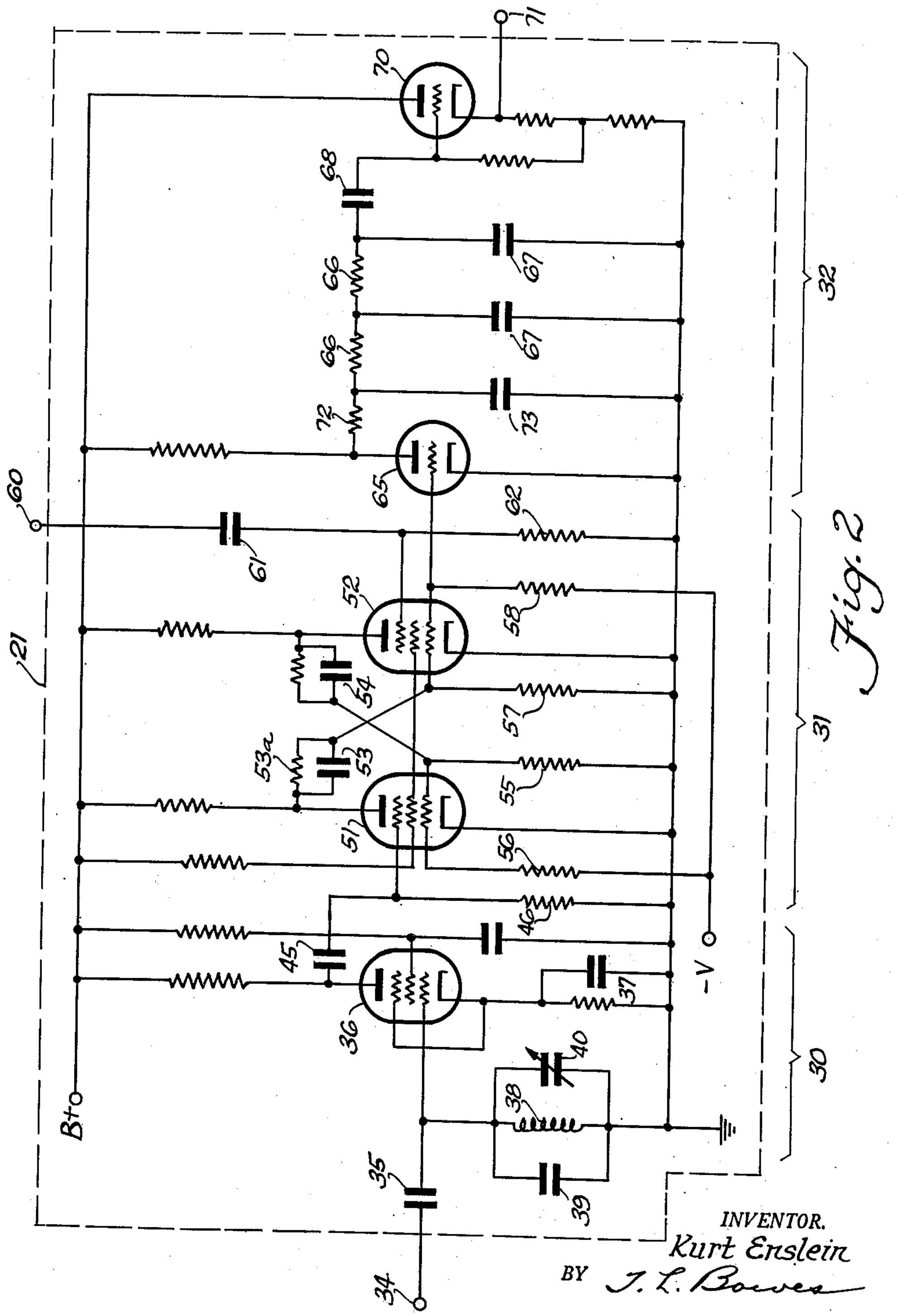
Fig. 2 is a detailed schematic diagram of one form of the vertical synchronization circuit of the television receiver shown in Fig. 1.

Referring now more particularly to the portions of the system of Fig. 1 embodying the present invention there is shown in Fig. 2 the improved vertical synchronization circuit of the present invention which includes a narrow band amplifier 30, an electronic switching circuit 31, and an integration network and ouput amplifier 32. The composite synchronizing signal is supplied from the synchronizing pulse clipper 17 through the coupling condenser 35 to the control electrode of a pentode type amplifier tube 36. The control electrode of the tube 36 is biased by means of a conventional self biasing network 37 in the cathode thereof, and a parallel resonant circuit comprising the inductance 38 and the condensers 39 and 40 is connected between the control electrode of the tube 36 and ground.

Signals developed at the anode of the tube 36 are coupled through the condenser 45 to the electronic switching circuit 31. The switching circuit 31 comprises a pair of pentode type tubes 51 and 52, the synchronizing signal supplied from the condenser 45 being coupled to the suppressor grid of the tube 51. The anode of each of the tubes 51 and 52 is cross-connected to the control electrode of the opposite device through one of the resistor-capacitor networks, 53 and 54. The control electrode of the device 51 is also connected to ground through the resistor 55 and is further connected through the resistor 56 to a source of negative bias potential. Likewise, the control grid of the tube 52 is connected through the resistor 57 to ground and through the resistor 58 to the negative source of bias potential. Control pulses from the horizontal sweep generator 19 are supplied through the input terminal 60 and the coupling condenser 61 to the suppressor grid of the tube 52.

A reconstructed synchronizing voltage which appears at the control grid of the tube 52 is directly coupled to the control grid of a driver tube 65, included in the output amplifier 32. Amplified synchronizing voltage appearing at the anode of the tube 65 is coupled through an integrating network including the resistors 66 and 72 and the condensers 67 and 73 and through the coupling condenser 68 to the control grid of a cathode follower output tube 70. An output voltage suitable for driving the vertical scanning generator 22 is derived from the cathode of the tube 70 and appears at the output terminal 71.

Considering now the operation of the above-described vertical synchronization circuit, the resonant circuit 38, 39 and 40 is adjusted by variation of the condenser 40 so that the resonant frequency thereof is substantially higher than the frequency of the horizontal synchronizing pulses supplied from the synchronizing pulse clipper 17. Preferably the frequency of the tuned circuit 38, 39 and 40 is within the range of 108 to 110 kilocycles. Also, the band width of the resonant circuit is preferably quite narrow so as to obtain maximum rejection of noise impulses and other extraneous voltages which may be supplied to the vertical synchronization circuit 21 from the synchronizing pulse clipper 17. The composite television synchronizing signal which is of negative polarity and which includes horizontal and vertical synchronizing pulses, is coupled to the resonant circuit 38, 39 and 40 through the condenser 35 and these pulses are injected into the resonant circuit so as to shock excite the resonant circuit into oscillation at its natural resonant frequency. There is thus produced across the resonant circuit a series of damped sinusoidal wave trains which start coincident with the beginning of each of the synchronizing pulses and which gradually decay to minimum amplitude just prior to the next succeeding synchronizing pulse.

The damped sinusoidal wave trains produced across the resonant circuit 38, 39, and 40 are amplified by the tube 36, are inverted in polarity in this tube, and are supplied through the coupling condenser 45 to the suppressor grid of the tube 51 in the electronic switching circuit 31. The switching circuit 31 is of the type commonly referred to as an Eccles-Jordan trigger circuit in which the tubes are alternately switched from a fully conductive to a nonconductive state in response to triggering pulses applied to the suppressor grids of each tube. Thus, when the tube 51 is conducting, the voltage dividing network including the resistors 53*a*, 57 and 58, which is connected between the anode of the tube 51 and the negative supply potential, is so chosen that the tube 52 will be driven beyond cutoff and hence will not be conductive. However, when a negative pulse, for example the initial portion of one of the damped sinusoidal wave trains produced in amplified form at the anode of the tube 36, is supplied to the suppressor grid of the tube 51, this tube is rendered nonconductive and the circuit abruptly switches so that the tube 52 becomes fully conductive and the tube 51 is cut off. Under these conditions it is necessary to turn off the tube 52 by supplying to the suppressor grid thereof a negative pulse in order to switch the circuit back to its original condition. To accomplish this, negative control pulses which are derived from the horizontal scanning generator of the television receiver are impressed upon the suppressor grid of the tube 52 over a path which includes the conductor 25, the condenser 61 and the input terminal 60.

In considering the operation of the above-described Eccles-Jordan trigger circuit, it will be understood that the circuit is insensitive to pulses of positive polarity so that only negative pulses are operative to trigger the circuit from one conductive state to the other. It is thus seen from the foregoing description that the switching circuit 31 is keyed by means of the damped sinusoidal wave trains to a first conductive position and is keyed to the opposite conductive position in response to each of the control pulses supplied to the tube 52 from the horizontal scanning generator 19. With this arrangement, a composite horizontal and vertical synchronizing pulse wave is reconstructed at the control grid of the tube 52 which is coupled through the driver tube 65 to the integration components, including the resistor 66 and the condenser 67, of the network 32. The integration network 32 integrates the reconstructed synchronizing signal formed in the switching circuit 50 to provide triggering pulses which have a recurrence rate equal to that of the original vertical synchronizing pulses. These triggering pulses are suitable for controlling the frequency of a conventional vertical sweep generator, such as the generator 22. More specifically, the triggering pulses thus produced in the integration circuit 32 are fed to the cathode follower output tube 70 so that there is produced at the cathode of the tube 70 positive triggering pulses which are suitable for directly synchronizing the vertical sweep generator 22. In this connection it will be understood that the vertical sweep generator 22 of the television receiver may be of any suitable type which is adapted to be synchronized by means of pulses which occur at the frame frequency. Thus, the vertical scanning generator 22 may include a conventional blocking oscillator which is directly synchronized by the pulses produced at the cathode of the tube 70, as will be readily understood by those skilled in the art.

In order more clearly to visualize the operation of the above-described vertical synchronizing circuit, reference is now made to Figs. 4(*a*) through 4(*e*), inclusive, wherein certain wave forms which occur at various points in the circuit of Fig. 2 are illustrated. Referring more particularly to Fig. 4(*a*), this figure illustrates the composite television synchronizing signal which is supplied from the clipper 17 to the input terminal 34 of the vertical synchronizing circuit 21. Thus, the composite television signal comprises the horizontal synchronizing pulses 80 which, under present standards, have a repetition rate of 15,750 cycles per second. These pulses are followed by equalizing pulses 81 occurring at twice the frequency of the horizontal synchronizing pulses 80. The equalizing pulses 81 are followed by vertical synchronizing pulses 82. The vertical pulses 82 are followed by another series of equalizing pulses 83, which are in turn followed by the horizontal synchronizing pulses 80.

In Fig. 4(*b*) there is illustrated the succession of damped simusoidal wave trains 85, which are produced across the resonant circuit 38, 39 and 40, in response to the pulse portions of the composite signal of Fig. 4(*a*). It will be seen from an inspection of Fig. 4(*b*) that the leading edge 86 of the damped wave train 85 coincides with the negative going portion of the horizontal equalizing and vertical pulses shown in Fig. 4(*a*). Thus, the leading edge 86 of the first pulse wave train coincides with the leading edge 87 of the first horizontal synchronizing pulse 80. Likewise, the leading edge 88 of the damped wave train 89 coincides with the leading edge 90 of the first equalizing pulse 91. Also, the leading edge 92 of the damped wave train 93 coincides with the negative going edge 94 of the vertical synchronizing pulse 95. In an entirely similar manner, the leading edges of the remaining damped wave trains coincide exactly with the negative going edges of succeeding synchronizing pulses.

As explained above, the damped wave trains illustrated in Fig. 4(*b*) are amplified by the tube 36 (Fig. 2) and differentiated in the circuit including the condenser 45 and resistor 46 so as to provide the wave form shown in Fig. 4(*c*). It will be noted that the differentiated wave form of Fig. 4(*c*) comprises a series of positive pulses 100 which are immediately followed by the negative pulses 101. The pulses 100 are substantially coincident with the leading edge of each of the damped wave trains 85 so that there is produced, as a result of differentiation, the negative pulses 101 which occur slightly after the start of each damped wave train.

The control pulses which are derived from the horizontal scanning generator 19 are illustrated in Fig. 4(*d*). Referring to this figure, these control pulses are the pulses 110, which occur substantially coincident with the horizontal synchronizing pulses 80 and are produced during the retrace, or flyback interval of the horizontal scanning generator 19. As indicated above, the pulses 110 may be directly supplied from the secondary of the horizontal sweep transformer 24 as shown in Fig. 1. By comparing Figs. 4(*c*) and 4(*d*), it will be seen that the pulses 110 occur slightly before the pulses 101, so that the switching circuit 31 may be keyed to one position by the control pulses 110 and may thereafter be switched to the opposite position by means of following pulse 101, such that the wave form shown in Fig. 4(*e*) is reconstructed at the control grid of the tube 52.

Considering Figs. 4(*c*), 4(*d*) and 4(*e*) together, it will be seen that the first pulse 110 keys the switching circuit 31 to a given condition so as to produce the leading edge 120 of the first pulse shown in Fig. 4(*e*). The next succeeding pulse 101 from the amplifier 36 keys the switching circuit 31 back to its original condition so as to produce the trailing edge 121. In a similar manner, the control pulse 111 produces the leading edge 122 and the following negative pulse 102 produces the trailing edge 123. During the equalizing pulse interval, the negative control pulse 112 produces the leading edge 124 and the first succeeding negative pulse 103 produces the trailing edge 125. The intermediate negative pulse 104 is inoperative to key the switching circuit 31 due to the fact that the circuit 31 has already been keyed by the previous pulse 103. Accordingly, the equalizing pulses 81 are not reconstructed in the wave form of Fig. 4(*e*). During the vertical pulse period the control pulse 113 produces the leading edge 126 (Fig. 4(*e*)) and the next succeeding pulse 105 produces the trailing edge 127 of the reconstructed pulse shown in Fig. 4(*e*). The remaining vertical pulses and horizontal pulses are reconstructed in the switching circuit 31 in an entirely similar manner.

The pulses of the reconstructed wave form shown in Fig. 4(*e*), namely the pulses 130, which correspond to the original horizontal synchronizing pulses and the pulses 131 which are substantially similar to the original vertical synchronizing pulses, are integrated in the integration circuit 32 so as to provide the wave form shown in Fig. 4(*f*). Referring to this figure, during the interval of the short pulses 130, the integration network produces an output wave 134 of minimum amplitude. However, during the relatively long pulses 131, a positive triggering pulse 135 of larger amplitude is produced which substantially spans and coincides with the original vertical synchronizing interval, or in other words, the period occupied by the pulses 82 (Fig. 4(*a*)). The triggering pulse 135 is predominately positive and may be used to trigger the vertical scanning generator 22 in a manner which will be understood by those skilled in the art.

From the foregoing description, it will be understood that the present invention is substantially different from the so-called "flywheel" type of synchronization arrangement in which the synchronizing pulses are injected into a resonant circuit having a natural resonant frequency equal to that of the desired synchronizing pulses. In the improved vertical synchronization circuit described above, the frequency of the resonant circuit 38, 39 and 40 is substantially higher than the relatively high frequency of occurrence of the horizontal synchronizing pulses, although a relatively low frequency vertical triggering pulse is eventually derived from the sinusoidal wave train produced across the resonant circuit. Also, the resonant circuit is sufficiently damped so that the amplitude of the oscillations produced thereacross in response to each high frequency pulse can decay by a substantial amount before the next pulse. With this arrangement, the vertical synchronizing pulses, which occur during the vertical synchronizing interval and are of substantially different energy content than the horizontal synchronizing pulses, can influence the wave form of the damped wave trains on an amplitude basis so that subsequent integration produces a triggering pulse of relatively low frequency which is suitable for triggering a vertical scanning generator as described above. If the frequency of the resonant circuit is made too low, or the resonant circuit is undamped, a continuous sine wave of substantially constant amplitude results thus preventing discrimination on an amplitude basis between the horizontal and vertical synchronizing intervals.

A further important feature of the present invention resides in the above-described utilization of control pulses from the horizontal scanning generator 19 to at least partially control the keying of the switching circuit 31. According to the present invention, the horizontal scanning generator 19 is controlled by means of the AFC circuit 18, which may comprise any suitable phase and frequency sensitive control circuit which is substantially independent of noise impulses and other undesired disturbances so that the horizontal generator 19 is extremely stable in frequency and insensitive to noise. The AFC circuit 18 may comprise, for example, a phase comparison circuit in which a relatively long time constant is employed to derive a substantially unidirectional voltage which is relatively independent of noise impulses and other disturbances. In the vertical synchronization circuit of Fig. 2, the stable horizontal generator 19 acts as a standard, or reference control voltage for the vertical synchronization circuit. With this arrangement a stable noise free vertical scanning wave is produced without employing a separate AFC circuit for vertical synchronization.

Also, the use of the switching circuit 31 provides additional discrimination against noise due to the fact that the only information which is necessary to key the Eccles-Jordan trigger circuit is time information. Furthermore, in one direction, i. e. the direction controlled by the control pulses from the horizontal scanning generator, this switching circuit is additionally stabilized by the automatic frequency control circuit associated with the horizontal generator. Accordingly, a substantially noise-free vertical triggering pulse 135 (Fig. 4*f*) is provided and the vertical synchronization system is substantially independent of supply voltage variations and variations in the constants of circuit components. In addition, the use of the resonant circuit 38, 39 and 40 in the input circuit of the amplifier 36 provides additional noise discrimination due to the narrow pass band of this circuit, as a result of which noise components falling outside the pass band of the resonant circuit are rejected and the oscillations produced in the resonant circuit are substantially noise-free. In this connection, it is repeated that the pass band of the resonant circuit and its associated amplifier 36 is made quite narrow in order to obtain maximum noise discrimination. Moreover, the vertical trigger pulse 135, which has a fundamental frequency of sixty cycles, is produced upon integrating the reconstructed synchronizing signal shown in Fig. 4(*e*) without interfering with the noise reducing action of the narrow band circuit.

Figure 3:
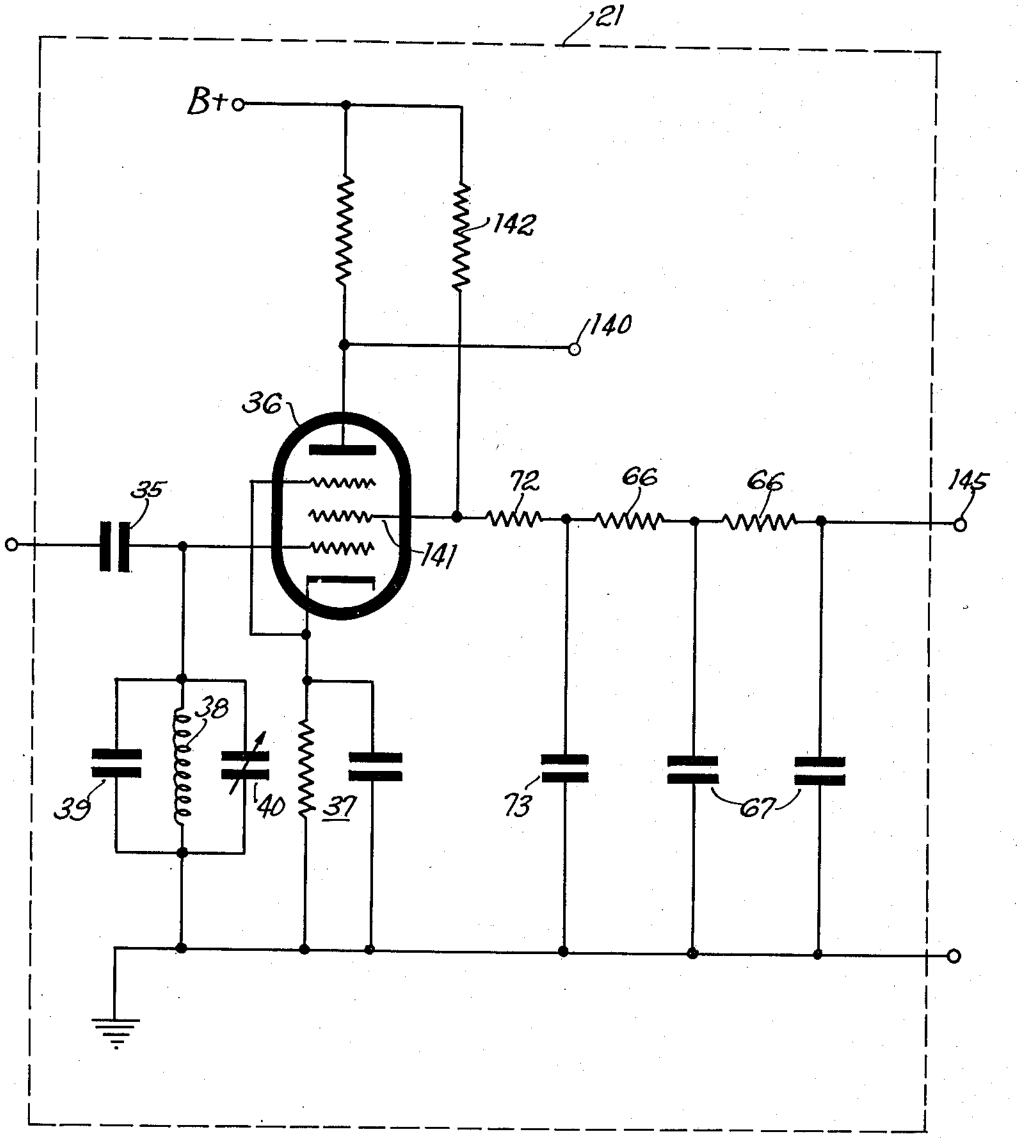
Fig. 3 is an alternative embodiment of the present improved vertical synchronization circuit which may be employed in the television receiver of Fig. 1.

To provide a simplified vertical synchronization arrangement, wherein substantial noise discrimination is achieved and reliable synchronization is provided with a minimum number of circuit components, the alternative embodiment of the present invention shown in Fig. 3 may be employed. In this modified arrangement, certain components of the system of Fig. 3 are identical with those employed in the circuit of Fig. 2, and accordingly the same reference numerals have been used to identify the same components of the two circuits. In the circuit of Fig. 3 the composite television synchronizing signal is again supplied through the coupling condenser 35 to the resonant circuit 38, 39 and 40, and to the control electrode of the amplifier tube 36. However, the anode circuit of the tube 36 is employed to supply an output wave to the terminal 140 which may be utilized in another portion of the receiver. For example, the damped sinusoidal wave trains produced at the anode of the tube 36 may be employed to effect synchronization of the horizontal scanning generator 19, in which case the AFC circuit 18 is not required. Accordingly, the vertical synchronization signal is derived from the screen electrode 141 of the tube 36, the screen electrode being connected to the B+ supply through the load resistor 142. The integration network is directly connected to the screen electrode 141 and comprises the resistors 66 and 72 and the condensers 67 and 73 in a manner similar to the integration network shown in Fig. 2. The integrated vertical synchronization pulse produced in the integration network 66 and 67 is supplied to the output terminal 145 from which it may be connected in any suitable manner, as through the cathode follower 70 (Fig. 2) to the vertical scanning generator 22 to effect synchronization thereof by triggering of the generator.

Figures 4A, 4B, 4C, 4D:
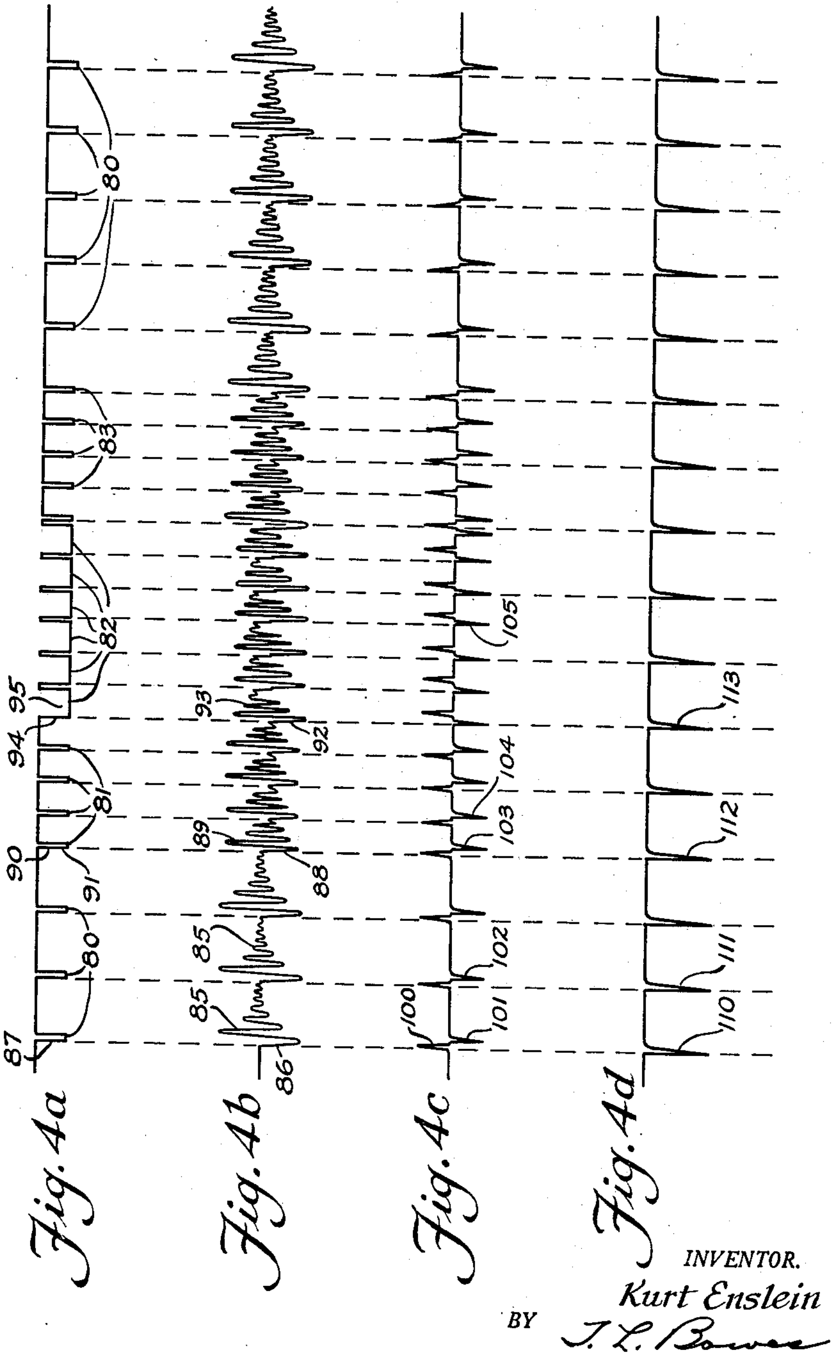
Figs. 4*a*–4*g* show a series of timing diagrams illustrating the wave forms which occur in the circuits of Figs. 2 and 3.
Figures 4E, 4F, 4G:
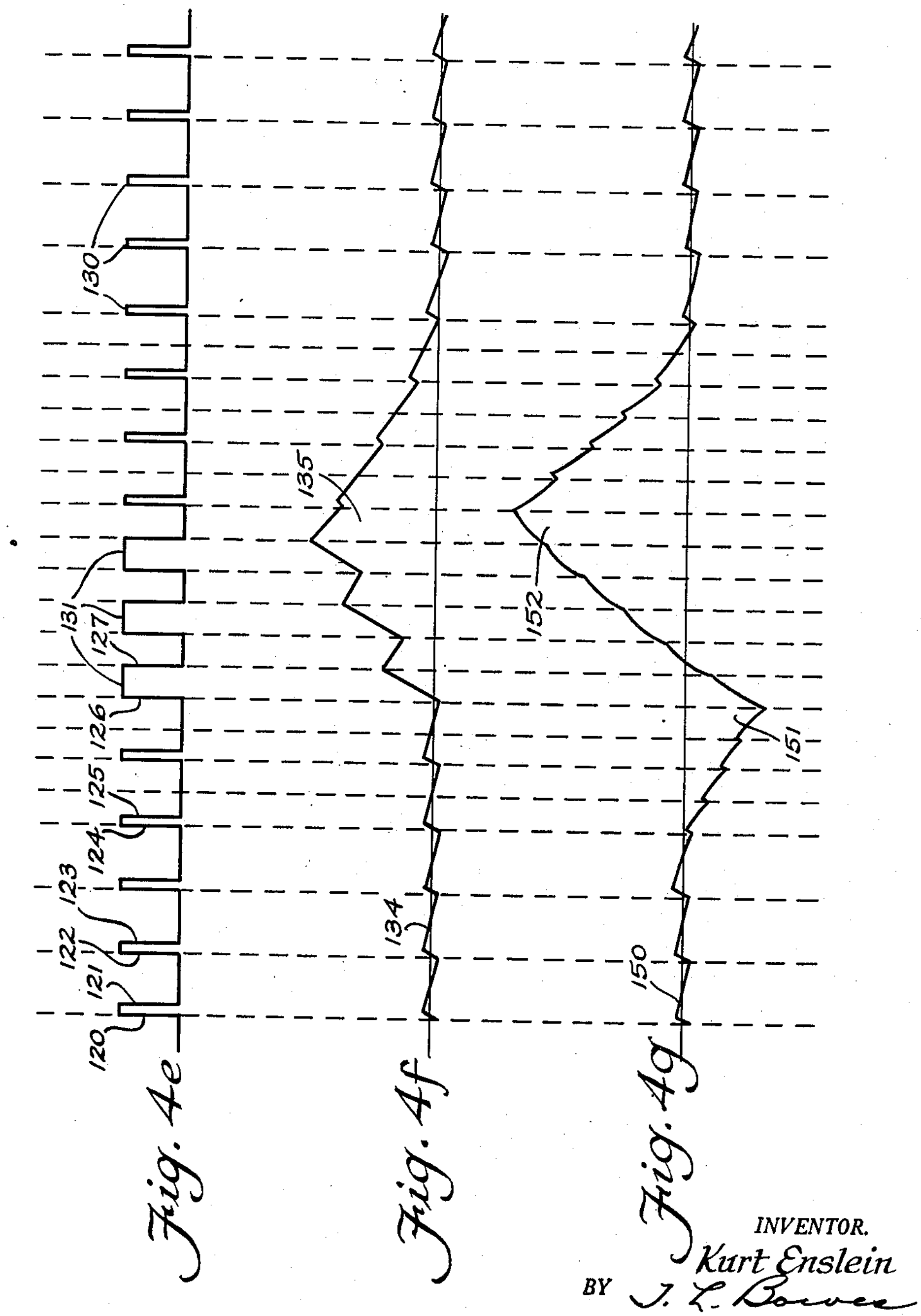

In considering the operation of the simplified circuit of Fig. 3 it will be seen that the composite wave form shown in Fig. 4(*a*) again operates to produce a series of damped wave trains across the resonant circuit 38, 39 and 40 as shown in Fig. 4(*b*) and discussed in connection therewith. The damped sinusoidal wave trains 85 are amplified in the tube 36 and are inverted in polarity so as to appear as damped wave trains of the opposite polarity at the screen electrode 141. In the circuit of Fig. 3, however, the composite synchronizing signal is not reconstructed in the manner shown in Fig. 4(*e*), but instead the wave trains 85 are directly integrated to produce the integrated wave shown in Fig. 4(*g*). Referring to this figure, it will be seen that during each interval spanned by the horizontal pulses 80 there is produced an output wave of minimum amplitude, as shown at 150. During the equalizing pulse interval the average value of the wave trains 89 decreases so as to produce the negative going wave portion 151. However, during the vertical synchronizing interval, i. e., during the interval spanned by the pulses 82 (Fig. 4*a*), the average value of the wave train 93 is predominantly positive so as to produce the relatively steep-sided pulse 152. The triggering pulse 152 may be supplied directly from the integration circuit 66 and 67 to the vertical scanning generator. In this connection it will be noted that the vertical triggering pulse 152 (Fig. 4*g*) is of larger amplitude than the corresponding triggering pulse 135 which is provided in the vertical synchronization circuit of Fig. 2. This is due to the fact that the reconstructed wave form shown in Fig. 4(*e*) has a smaller average value during the vertical synchronizing interval as will be evident from a comparison of the pulses 131 and the pulses 82 (Fig. 4*a*).

While there is illustrated in Fig. 2 a switching circuit employing pentode type tubes 51 and 52, it will be evident that various other arrangements may be employed. For example, triode type switching tubes may be employed together with suitable clipping circuits for preventing triggering of each tube by pulses other than pulses of a given polarity. Likewise, other types of narrow band amplifiers may be employed to provide discrimination against noise impulses and other extraneous voltages.

By way of illustration and not in any sense as a limitation to the physical values given, the following circuit constants have been found suitable in a vertical synchronization circuit constructed as shown in Fig. 2 and wherein the tube 36 was a commercial type 6CB6, the tubes 51 and 52 commercial type 6AS6's, and the tubes 65 and 70 a dual triode commercial type 12AU7. Other circuit constants follow:

| | | |
|---|---|---|
| Condenser 35 | mmf | 39 |
| Condenser 39 | mmf | 820 |
| Condenser 40 | mmf | 50 |
| Condenser 45 | mmf | 10 |
| Condenser 61 | mmf | 22 |
| Condenser 67 | mmf | 680 |
| Condenser 68 | mfd | .01 |
| Condenser 73 | mmf | 2,200 |
| Resistor 46 | ohms | 47,000 |
| Resistor 53 | ohms | 68,000 |
| Resistor 54 | ohms | 68,000 |
| Resistor 55 | ohms | 10,000 |
| Resistor 56 | ohms | 51,000 |
| Resistor 57 | ohms | 10,000 |
| Resistor 58 | ohms | 51,000 |
| Resistor 62 | ohms | 47,000 |
| Resistor 66 | ohms | 47,000 |
| Resistor 72 | ohms | 22,000 |
| Inductance 38 | mh | 1.9 |

While there have been described what are at present considered to be the preferred embodiments of the invention it will be understood that various modifications may be made therein which are within the true spirit and scope of the invention as defined in the appended claims.

What is claimed as new and desired to be secured by Letters Patent of the United States is:

1. In a television receiver, the combination of, a sweep signal generator, means for receiving and detecting synchronizing pulses, means responsive to each detected pulse for producing a damped sinusoidal wave train, means for integrating said damped wave trains to produce triggering pulses in time coincidence with said detected pulses, and means for applying said triggering pulses to said generator to control the operation of said generator.

2. In a television receiver, the combination of, a vertical scanning generator, a source of television synchronizing signals including means for providing horizontal and vertical synchronizing pulses, means for deriving from said source a damped sinusoidal wave train in response to each of said vertical and horizontal synchronizing pulses, means for integrating said damped wave trains to provide triggering pulses substantially coincident with said vertical synchronizing pulses, and means for controlling said vertical scanning generator in accordance with said triggering pulses.

3. In a television receiver, the combination of, a vertical scanning generator, a source of television synchronizing signals including horizontal and vertical synchronizing pulses, means including a narrow band resonant circuit tuned to a frequency higher than said horizontal synchronizing pulses for deriving from said source a damped sinusoidal wave train in response to each of said pulses, means for producing from said damped wave trains triggering pulses in time coincidence with said vertical synchronizing pulses, and means for controlling said vertical scanning generator in accordance with said triggering pulses.

4. In a television receiver, the combination of, a vertical scanning generator, a source of television synchronizing signals including horizontal and vertical synchronizing pulses, means for deriving from said source a damped sinusoidal wave train in response to each of said pulses, means including an integration network for deriving from said damped wave trains triggering pulses in time coincidence with said vertical synchronizing pulses, and means for controlling said vertical scanning generator in accordance with said triggering pulses.

5. In a television receiver, a combination of, a vertical scanning generator, a source of television synchronizing signals including horizontal and vertical synchronizing pulses, means for deriving from said source a sinusoidal wave train having amplitude variations corresponding to said vertical and horizontal synchronizing pulses, means for integrating said sinusoidal wave train to provide triggering pulses having a recurrence rate equal to that of said vertical synchronizing pulses, and means for controlling said vertical scanning generator in accordance with said triggering pulses.

6. In a television receiver, the combination of, a vertical scanning generator, a source of television synchronizing signals including horizontal and vertical synchronizing pulses, an amplifier coupled to said source and tuned to a frequency substantially higher than the frequency of said horizontal synchronizing pulses, means for integrating the output of said amplifier to obtain triggering pulses, and means for synchronizing said vertical scanning generator with said triggering pulses.

7. In a television receiver, the combination of, a vertical scanning generator, a source of television synchronizing signals including horizontal and vertical synchronizing pulses, means including an amplifier coupled to said source for deriving a damped sinusoidal wave train in response to each of said horizontal and vertical pulses, means for integrating said damped wave trains over a period long as compared to the time between said horizontal synchronizing pulses and much shorter than the period of said vertical synchronizing pulses, and means for synchronizing said vertical scanning generator with said integrated damped wave trains.

8. In a television receiver, the combination of, a vertical scanning generator, a source of television synchronizing signals including horizontal and vertical synchronizing pulses, means for deriving a damped sinusoidal wave train having a frequency substantially higher than said horizontal synchronizing pulses in response to each of said horizontal and vertical synchronizing pulses, means for integrating said damped wave trains to provide triggering pulses at the recurrence rate of said vertical synchronizing pulses, and means for controlling said vertical scanning generator in accordance with said triggering pulses.

9. In a television receiver, the combination of, a vertical scanning generator, a source of television synchronizing signals including horizontal and vertical synchronizing pulses, a resonant circuit, means for injecting television synchronizing signals from said source into said resonant circuit to produce a sinusoidal wave train thereacross having amplitude variations corresponding to said vertical and horizontal synchronizing pulses, means for integrating said sinusoidal wave train to provide triggering pulses having a recurrence rate equal to that of said vertical synchronizing pulses, and means for controlling said vertical scanning generator in accordance with said triggering pulses.

10. In a television receiver, the combination of, a vertical scanning generator, a source of television synchronizing signals including horizontal and vertical synchronizing pulses, a resonant circuit tuned to a frequency substantially above the frequency of said horizontal synchronizing pulses, means for coupling said television synchronizing signals into said resonant circuit to produce damped sinusoidal wave trains in response to each of said pulses, means for amplifying said damped wave trains, means for integrating said amplified damped wave trains over a period long as compared to the time between said horizontal synchronizing pulses and much shorter than the period of said vertical synchronizing pulses to provide triggering pulses recurring at the rate of said vertical synchronizing pulses, and means for controlling said vertical scanning generator in accordance with said triggering pulses.

11. In a television receiver, the combination of, a vertical scanning generator, a source of television synchronzing signals including vertical and horizontal synchronizing pulses, a resonant circuit tuned to a frequency substantially above the frequency of said horizontal synchronizing pulses, means for coupling said television synchronizing signals into said resonant circuit to produce damped sinusoidal wave trains in response to each of said pulses, means for integrating said damped wave trains to provide triggering pulses recurring at the rate of said vertical synchronizing pulses, and means for controlling said vertical scanning generator in accordance with said triggering pulses.

12. In a television receiver, the combination of, a vertical scanning generator, a source of television synchronizing signals including vertical and horizontal synchronzing pulses, a resonant circuit tuned to a frequency substantially higher than the frequency of said horizontal synchronizing pulses, means for injecting said television synchronzing signals into said resonant circuit to excite the same at its natural frequency, means for deriving from said resonant circuit damped sinusoidal wave trains in response to each of said pulses, means for integrating said damped wave trains to provide triggering pulses having a recurrence rate equal to that of said vertical synchronizing pulses, and means for controlling said vertical scanning generator in accordance with said triggering pulses.

13. In a television receiver, the combination of, a vertical scanning generator, a source of television synchronizing signals including vertical and horizontal synchronizing pulses, a resonant circuit tuned to a frequency substantially higher than the frequency of said horizontal synchronizing pulses, means utilizing said television synchronizing signals for shock exciting said resonant circuit into oscillation at its natural frequency thereby to produce damped sinusoidal wave trains in response to each of said pulses, means for integrating said damped wave trains to provide triggering pulses having a recurrence rate equal to that of said vertical synchronizing pulses, and means for controlling said vertical scanning generator in accordance with said triggering pulses.

14. In a television receiver, the combination of, a vertical scanning generator, a source of television synchronizing signals including vertical and horizontal synchronizing pulses, a resonant circuit tuned to a frequency substantially higher than the frequency of said horizontal synchronizing pulses, an amplifier tube, means connecting said resonant circuit between a control electrode and the cathode of said tube, means including a condenser connected to said control electrode for injecting said television synchronizing signals into said resonant circuit to produce damped sinusoidal wave trains thereacross in response to each of said pulses, means for deriving from an output electrode of said tube said damped wave trains in amplified form, means for integrating said damped wave trains over a period long as compared to the time between said horizontal synchronizing pulses and much shorter than the period of said vertical synchronizing pulses to provide triggering pulses recurring at the rate of said vertical synchronizing pulses, and means for controlling said vertical scanning generator in accordance with said triggering pulses.

15. In a television receiver, the combination of, a vertical scanning generator, a source of television synchronizing signals including vertical and horizontal synchronizing pulses, a resonant circuit tuned to a frequency substantially higher than the frequency of said horizontal synchronizing pulses, a pentode type amplifier tube, means connecting said resonant circuit between a control electrode and the cathode of said tube, means including a condenser connected to said control electrode for injecting said television synchronizing signals into said resonant circuit to produce damped sinusoidal wave trains thereacross in response to each of said pulses, means for deriving from the screen electrode of said tube said damped wave trains in amplified form, means for integrating said damped wave trains to provide triggering pulses recurring at the rate of said vertical synchronizing pulses, and means for controlling said vertical scanning generator in accordance with said triggering pulses.

16. In a television receiver, the combination of, a vertical scanning generator, a source of synchronizing signals including horizontal and vertical synchronizing pulses, a resonant circuit having a frequency substantially higher than the frequency of said horizontal synchronizing pulses, means for injecting said synchronizing signals into said resonant circuit thereby to produce damped sinusoidal wave trains in response to each of said pulses, an electronic switching circuit, means for keying said switching circuit to a given position in response to said damped wave trains, a horizontal scanning generator, means for deriving from said horizontal scanning generator control pulses having a recurrence rate equal to that of said horizontal synchronizing pulses, means for keying said switching circuit to the opposite position in response to said control pulses, means for integrating the output of said switching circuit to provide triggering pulses having a recurrence rate equal to that of said vertical synchronizing pulses, and means for controlling said vertical scanning generator in accordance with said triggering pulses.

17. In a television receiver, the combination of, a vertical scanning generator, a source of synchronizing signals including horizontal and vertical synchronizing pulses, a resonant circuit tuned to a frequency substantially higher than the frequency of said horizontal synchronizing pulses, an amplifier tube, means connecting said resonant circuit between the control electrode and the cathode of said tube, means including a condenser connected to said control electrode for injecting said television synchronizing signals into said resonant circuit to produce damped sinusoidal wave trains thereacross in response to each of said pulses, means for deriving from an output electrode of said tube said damped wave trains in amplified form, an electronic switching circuit, means for keying said switching circuit to a given position in response to said amplified damped wave trains, a horizontal scanning generator effectively controlled by said horizontal synchronizing pulses, means for deriving control pulses from said horizontal generator, means for keying said switching circuit to the opposite position in response to said control pulses, means for integrating the output of said switching circuit over a period long as compared to the time between said horizontal synchronizing pulses and shorter than the period of said vertical synchronizing pulses to obtain triggering pulses having a recurrence rate equal to that of said vertical synchronizing pulses, and means for controlling said vertical scanning generator in accordance with said triggering pulses.

18. In a television receiver, the combination of, a vertical scanning generator, a source of synchronizing signals including horizontal and vertical synchronizing pulses, a horizontal scanning generator, automatic frequency control means controlled by said source for controlling the frequency of said horizontal scanning generator, and means controlled jointly by said source and said horizontal scanning generator for controlling the frequency of said vertical scanning generator.

19. In a television receiver, the combination of, a vertical scanning generator, a source of synchronizing signals including horizontal and vertical synchronizing pulses, a horizontal scanning generator, automatic frequency control means controlled by said source for controlling the frequency of said horizontal scanning generator, and means controlled at least partially by said horizontal scanning generator for controlling the frequency of said vertical scanning generator.

20. In a television receiver, the combination of, a first scanning generator, a source of synchronizing signals including horizontal and vertical synchronizing pulses, a second scanning generator, automatic frequency control means controlled by said source for controlling the frequency of said second generator, and means controlled at least in part by said second scanning generator for controlling the frequency of said first scanning generator.

21. In a television receiver, the combination of, a first scanning generator, a source of synchronizing signals including horizontal and vertical synchronizing pulses, a second scanning generator arranged to provide a scanning wave of substantially different frequency than said first scanning generator, automatic frequency control means controlled by said source for controlling the frequency of said second generator, and means controlled at least in part by said second scanning generator for controlling the frequency of said first scanning generator.

22. In a television receiver, the combination of, a vertical scanning generator, a source of television synchronizing signals including horizontal and vertical synchronizing pulses, a horizontal scanning generator, automatic frequency control means controlled by said horizontal synchronizing pulses for stabilizing the frequency of said horizontal scanning generator and holding said generator in synchronism with said horizontal synchronizing pulses, and means controlled at least in part by said horizontal scanning generator for controlling the frequency of said vertical scanning generator.

23. In a television receiver, the combination of, a vertical scanning generator, a source of synchronizing signals including horizontal and vertical synchronizing pulses, a horizontal scanning generator, means for comparing the output of said horizontal scanning generator and said horizontal synchronizing pulses to derive a substantially unidirectional voltage representative of the phase relationship between said horizontal synchronizing pulses and said horizontal scanning generator, means for controlling the frequency of said horizontal scanning generator in accordance with said unidirectional voltage, and means including an electronic switching circuit controlled jointly by said horizontal scanning generator and vertical synchronizing pulses from said source for controlling the frequency of said vertical scanning generator.

24. In a television receiver, the combination of a vertical scanning generator, a source of synchronizing signals including horizontal and vertical synchronizing pulses, a horizontal scanning generator, means for synchronizing said horizontal scanning generator with said horizontal synchronizing pulses, and means controlled at least in part by said horizontal scanning generator for synchronizing said vertical scanning generator with said vertical synchronizing pulses.

25. In a television receiver, the combination of, a vertical scanning generator, a source of television synchronizing signals including horizontal and vertical synchronizing pulses, means including a resonant circuit for deriving from said source a periodic wave train having amplitude variations corresponding to said vertical and horizontal synchronizing pulses, means for integrating said periodic wave train to provide triggering pulses having a recurrence rate equal to that of said vertical synchronizing pulses, and means for controlling said vertical scanning generator in accordance with said triggering pulses.

26. In a television receiver, the combination of, a vertical scanning generator, a source of synchronizing signals including horizontal and vertical synchronizing pulses, a resonant circuit having a frequency higher than the frequency of said horizontal synchronizing pulses, means for injecting said synchronizing signals into said resonant circuit to produce oscillations thereacross in response to each of said pulses, a horizontal scanning generator effectively controlled by said horizontal synchronizing pulses, and means controlled jointly by said produced oscillations and the output of said horizontal scanning generator for controlling said vertical scanning generator.

27. In a television receiver, the combination of, a vertical scanning generator, a source of synchronizing signals including horizontal and vertical synchronizing pulses, a resonant circuit having a frequency higher than the frequency of said horizontal synchronizing pulses, means for injecting said synchronizing signals into said resonant circuit to produce oscillations thereacross in response to each of said pulses, a horizontal scanning generator, means controlled jointly by said horizontal synchronizing pulses and the output of said horizontal scanning generator for controlling the frequency of said horizontal scanning generator, and means controlled jointly by said produced oscillations and the output of said horizontal scanning generator for controlling the frequency of said vertical scanning generator.

28. In a television receiver, the combination of, a vertical scanning generator, a source of synchronizing signals including horizontal and vertical synchronizing pulses, a narrow band resonant circuit having a frequency higher than the frequency of said horizontal synchronizing pulses, means for injecting said synchronizing signals into said resonant circuit to produce oscillations thereacross in response to each of said pulses, a horizontal scanning generator, means for comparing the output of said horizontal oscillator and said horizontal synchronizing pulses to derive a substantially unidirectional voltage representative of the phase relationship between said horizontal synchronizing pulses and the output of said horizontal scanning generator, means for controlling the frequency of said horizontal scanning generator in accordance with said unidirectional voltage, means for deriving control pulses from said horizontal scanning generator, means jointly responsive to said control pulses and said produced oscillations for developing an artificial synchronizing signal having portions corresponding to said horizontal synchronizing pulses and portions corresponding to said vertical synchronizing pulses, means for integrating said artificial synchronizing signal to obtain triggering pulses, and means for controlling said vertical scanning generator in accordance with said triggering pulses.

KURT ENSLEIN.

References Cited in the file of this patent

UNITED STATES PATENTS

| Number | Name | Date |
|---|---|---|
| 2,344,810 | Fredendall | Mar. 21, 1944 |
| 2,431,577 | Moore | Nov. 25, 1947 |
| 2,458,156 | Fredendall | Jan. 4, 1949 |
| 2,529,172 | Moe | Nov. 7, 1950 |
| 2,611,033 | Jones | Sept. 16, 1952 |